No. 639,330. Patented Dec. 19, 1899.
W. ZONKER.
CHURN.
(Application filed Mar. 1, 1899.)
(No Model.)
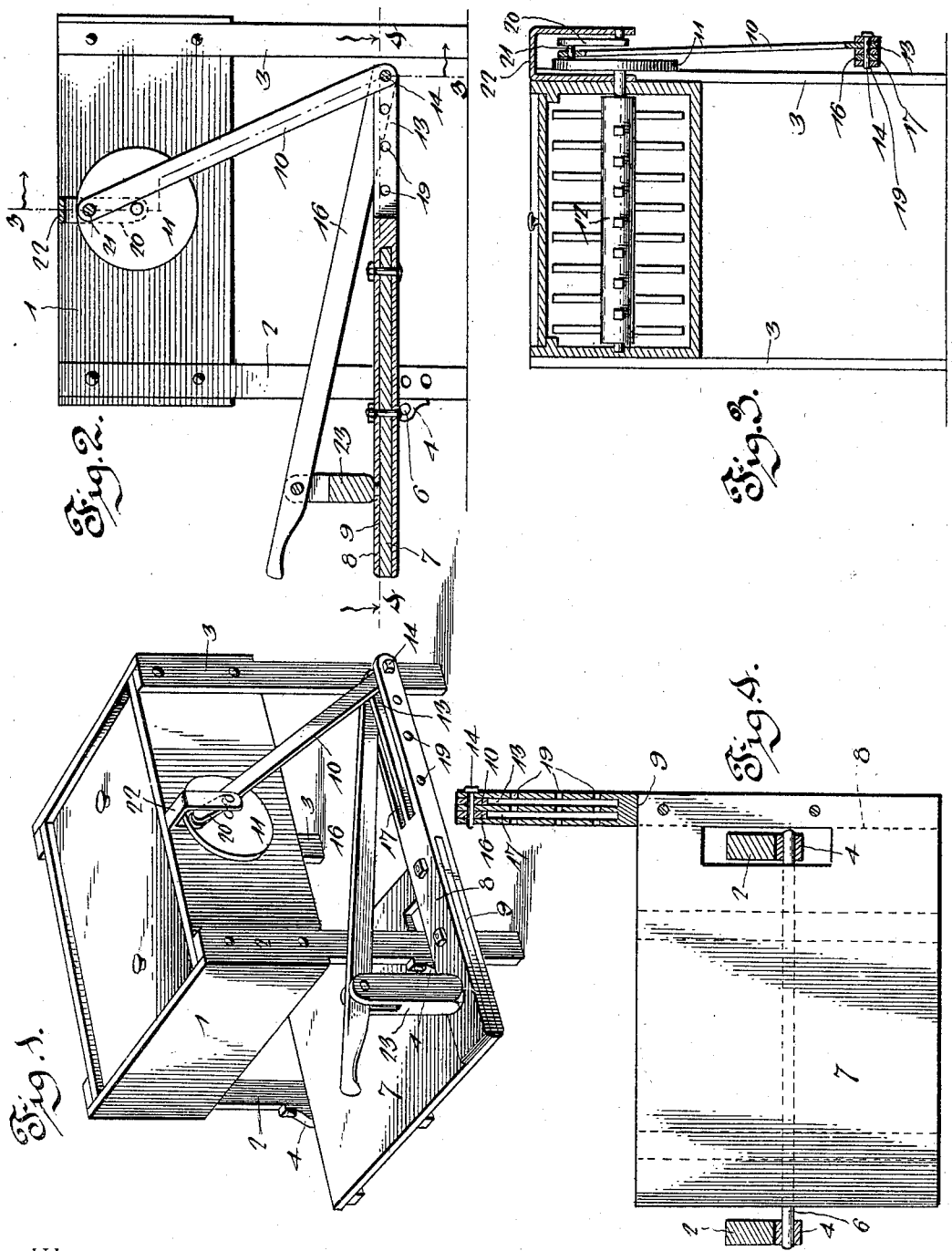

UNITED STATES PATENT OFFICE.

WAYNE ZONKER, OF CORUNNA, INDIANA.

CHURN.

SPECIFICATION forming part of Letters Patent No. 639,330, dated December 19, 1899.

Application filed March 1, 1899. Serial No. 707,290. (No model.)

*To all whom it may concern:*

Be it known that I, WAYNE ZONKER, a citizen of the United States, residing at Corunna, in the county of De Kalb and State of Indiana, have invented a new and useful Churn, of which the following is a specification.

The invention relates to improvements in churns.

The object of the present invention is to improve the construction of churns, more especially the means for operating the same, and to provide a simple, inexpensive, and efficient device adapted to enable the churn to be operated at the expenditure of a minimum amount of labor and capable of effecting a rapid production of butter.

A further object of the invention is to enable the churn to be operated by foot to produce the butter and to provide means for agitating the dasher by hand to assist in collecting the butter.

The invention consists in the construction and novel combination and arrangement of parts hereinafter fully described, illustrated in the accompanying drawings, and pointed out in the claims hereto appended.

In the drawings, Figure 1 is a perspective view of a churn constructed in accordance with this invention. Fig. 2 is a vertical longitudinal sectional view. Fig. 3 is a transverse sectional view on line 3 3 of Fig. 2. Fig. 4 is a detail sectional view on line 4 4 of Fig. 2.

Like numerals of reference designate corresponding parts in all the figures of the drawings.

1 designates a churn-body provided with front and rear legs 2 and 3, arranged in pairs, as shown, the front legs being provided with bearings 4 to receive a transverse shaft 6, upon which is mounted a treadle 7. The treadle 7, which is provided near one end with an opening to receive the adjacent leg, extends across the front of the churn and projects beyond one side thereof, the projecting portion carrying a bar 8. This bar 8, which extends longitudinally of the churn, at one side thereof, has a horizontal bifurcation 9 to receive the treadle, and it is bolted or otherwise secured to the same and has its rear portion projecting therefrom and provided with a vertical bifurcation to receive a pitman 10. The pitman 10 is eccentrically connected at its upper end with a wheel 11, that is mounted upon a transverse dasher-shaft 12. The lower end of the pitman 10 is pivoted in the bifurcation 13 by a transverse fastening device 14, which also pivots a hand-lever 16 in a bifurcation 17, arranged parallel with the bifurcation 13, and the rear end of the bar 8 is provided with a series of perforations to effect an adjustment of the pitman and the hand-lever. The perforations 19 enable the pitman 10 to be changed to correspond to any adjustment of the treadle, the legs 2 being provided with a series of bearing-openings for this purpose. The upper end of the pitman is supported by a crank 20, connected with the wrist-pin 21 and mounted on the outer portion of a transverse supporting-frame 22, composed of inner and outer vertical sides and a connecting horizontal top bar. The inner side of the transverse supporting-frame 22 is mounted on the churn, and the crank and the wheel are arranged between its sides.

The treadle is adapted to be operated to effect the production of butter, and after the operation of churning has been completed and it is desired to collect the butter the dasher-shaft may be rotated by the hand-lever 16, arranged at an angle to the treadle, extending upward and forward from the rear end of the bar 8 and supported between its ends by a bracket 23, mounted upon the front portion of the treadle and having a bifurcation for the reception of a lever, which is secured to it by a pin. The pivot of the lower end of the pitman secures the lower end of the lever to the bar 8 and the lever is adjusted with the pitman.

The dasher-shaft, which is disposed horizontally, is provided with radially-arranged blades disposed at intervals, as shown, and when the dasher is rotated it agitates the cream sufficiently to produce butter in a very short space of time.

The invention has the following advantages: The churn, which is simple and comparatively inexpensive in construction, is adapted to effect a rapid production of butter. It is adapted to be operated by foot, and after the operation of churning has been completed the dasher may be rotated by hand to assist in collecting butter. The wheel and the upper end of the pitman are supported by the outer crank, which is journaled on the outside of the transversely-disposed frame.

Changes in the form, proportion, size, and the minor details of the construction within the scope of the appended claims may be resorted to without departing from the spirit or sacrificing any of the advantages of this invention.

What is claimed is—

1. A device of the class described comprising a body or receptacle, a wheel arranged on the exterior of the same and designed to be connected with a suitable agitator, a treadle provided with an extension, a pitman pivotally connected with the extension of the treadle, and with the said wheel, and an inclined hand-lever supported between its ends upon the treadle and being rigid with the same and having its lower end connected with the extension of the treadle by the pivot of the lower end of the pitman, substantially as described.

2. A device of the class described comprising a body or receptacle, a dasher or agitator, a wheel connected with the same, a transverse frame arranged at one side of the receptacle, a wheel arranged within the frame and connected with the agitator or dasher, a pitman connected with the wheel, a crank supporting the pitman and mounted on the transverse frame, and a treadle connected with the pitman, substantially as described.

3. A device of the class described comprising a body or receptacle, an agitator or dasher arranged therein, a pitman connected at its upper end with the agitator or dasher, a treadle pivoted to the pitman, and a hand-lever rigidly mounted upon the treadle and arranged at an angle to the same and having its lower end secured to the treadle by the pivot of the pitman, substantially as described.

4. A device of the class described comprising a body or receptacle having legs, a treadle pivotally mounted thereon and provided with an opening to receive one of the legs and extending laterally therefrom, a bifurcated bar receiving the projecting portion of the treadle in its bifurcation, a bracket mounted on the treadle and located at one side of the body or receptacle, an inclined hand-lever supported between its ends by the bracket and having its lower end connected to the bar, a dasher or agitator, and a pitman extending from the bar and connected with the agitator or dasher, substantially as described.

5. A device of the class described comprising a body or receptacle, a treadle pivotally mounted thereon, a bar mounted on the treadle, extending therefrom and having vertical openings or bifurcations, a pitman having its lower end arranged in one of the openings or bifurcations, a hand-lever fitting in the other opening or bifurcation, a fastening device mounted on the bar and adjustably securing both the pitman and the lever to the same, means for supporting the hand-lever at an inclination, and a dasher or agitator connected with the pitman, substantially as described.

In testimony that I claim the foregoing as my own I have hereto affixed my signature in the presence of two witnesses.

WAYNE ZONKER.

Witnesses:
WILLIAM A. ZONKER,
AUGUST FRAAS.